Oct. 7, 1958
R. L. TWEEDALE
2,855,582
WARNING INDICATOR FOR VEHICLES
Filed April 8, 1957
2 Sheets-Sheet 1
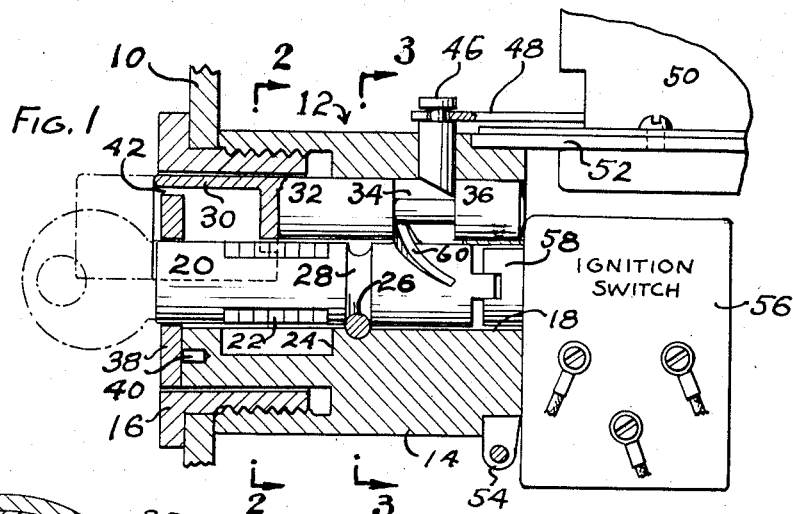
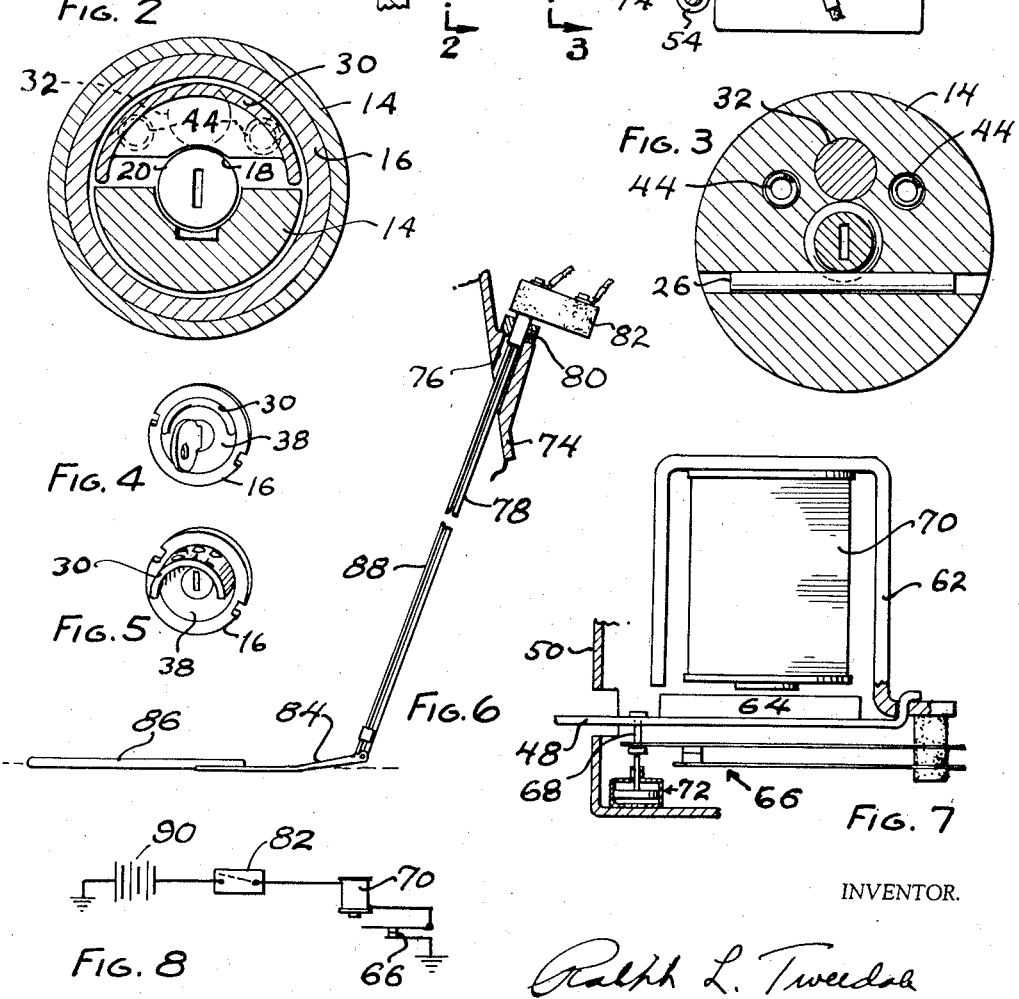
INVENTOR.
Ralph L. Tweedale INVENTOR.
Ralph L. Tweedale

United States Patent Office 2,855,582
Patented Oct. 7, 1958

2,855,582

WARNING INDICATOR FOR VEHICLES

Ralph L. Tweedale, Birmingham, Mich.

Application April 8, 1957, Serial No. 651,549

12 Claims. (Cl. 340—59)

This application is a continuation-in-part of my copending application No. 410,913, filed Feb. 17, 1954, now abandoned and similarly entitled.

This invention relates to indicators and more particularly to an indicator for use on vehicles for showing abnormal conditions such as low oil level, low water level, and other detrimental conditions.

The invention is more particularly concerned with an indicator which is coordinated with the electrical system of the vehicle so as to become operative only after the vehicle engine has been stopped.

There are many conditions in a vehicle which require surveillance by the driver for which a warning device is desirable ot show when the condition being observed requires attention. A good example is the level of the oil in the engine crankcase. While most vehicles provide a continuous indication of oil pump pressure at the dashboard, it has not been customary to show crankcase oil level at that point. Rather, the crude and familiar dipstick is almost universally relied upon for this purpose. The level of fluids such as the oil in the crankcase or the water in the radiator are subject to variation and agitation while the engine is running, and consequently it is desirable to measure the level after the engine has stopped.

It is an object of the present invention to provide an electrically operated indicator for a varying condition on a vehicle which will be rendered effective only both when the engine has been stopped and when the condition being observed has changed to a predetermined value.

A further object is to provide such an indicator wherein a warning may be shown after the engine has stopped, and which will not draw battery current while the warning is effective.

Another object is to provide an indicator associated with the usual ignition switch in a manner to insure the driver's attention to its warning indication at the time when he is about to start the engine.

Further objects and advantages of the present invention will be apparent from the following description, reference being had to the accompanying drawing wherein a preferred form of the present invention is clearly shown.

In the drawing:

Fig. 1 is a longitudinal sectional view of a combined ignition control and warning indicator embodying one form of the present invention.

Fig. 2 is a cross section on line 2—2 of Fig. 1.

Fig. 3 is a cross section on line 3—3 of Fig. 1.

Fig. 4 is a perspective view of the end of the device shown in Fig. 1 with the indicator in non-warning position.

Fig. 5 is a view corresponding to Fig. 4 with the indicator in warning position.

Fig. 6 is a fragmentary sectional view of an engine crankcase showing a float switch mounted in the dipstick hole.

Fig. 7 is a fragmentary sectional view showing a solenoid and relay forming a portion of the mechanism in Fig. 1.

Fig. 8 is a circuit diagram of the elements utilized in this form of invention.

Figure 9:
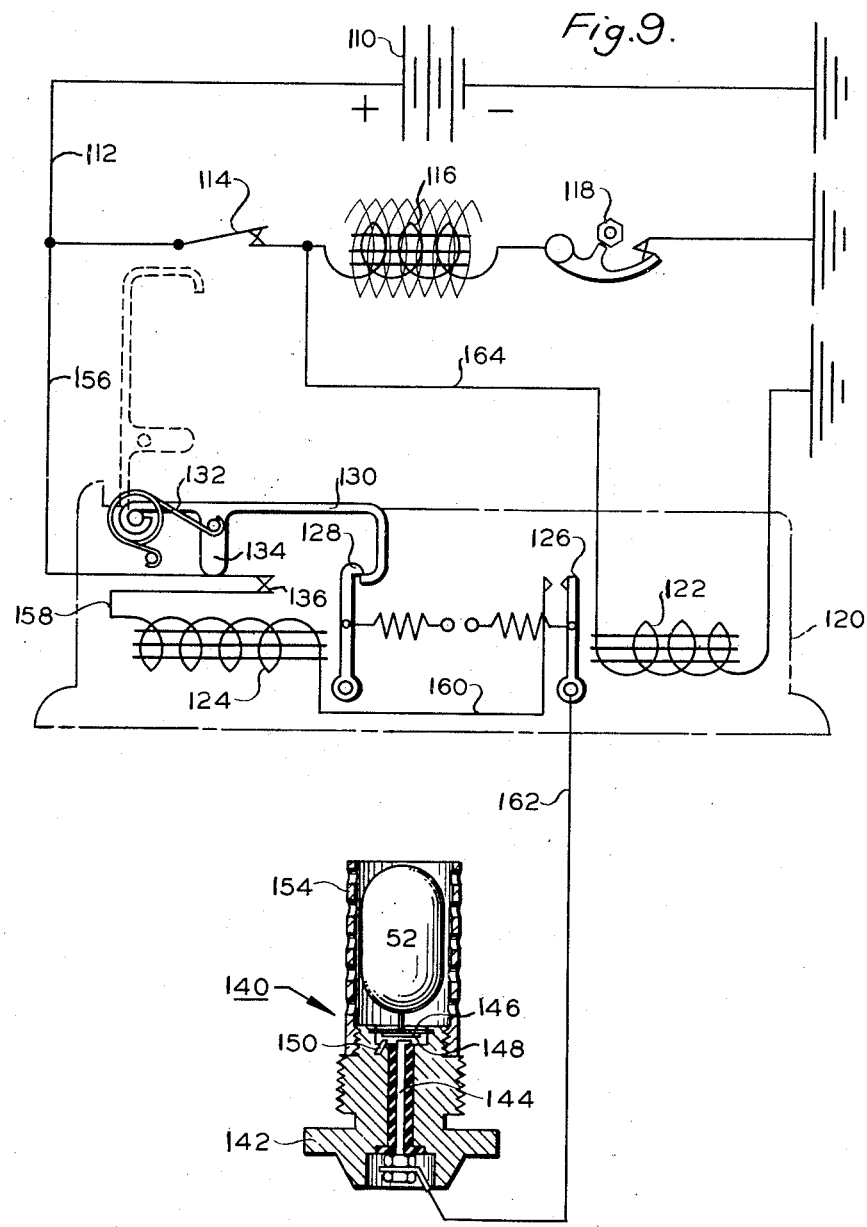
Fig. 9 is a circuit diagram showing another form of the present invention.

Referring now to Figs. 1 to 3, there is shown a section of a vehicle dashboard panel indicated at 10 and having an opening in which is mounted a combined ignition control and indicator generally designated 12. The body 14 thereof is secured to the panel 10 by a nut 16. The body 14 has a bore 18 within which is mounted a lock cylinder 20 having tumblers 22 engageable with a recess 24. A cross pin 26 engages a groove 28 on the cylinder 20 to retain the latter in position. At its left hand end, the bore 18 opens into a chamber of semi-cylindrical shape within which is slideably mounted an indicator 30. The latter has a stem 32 provided with a recess 34 and an end section 36 and slideable in a suitable bore in the body 14.

A cover plate 38 having pins 40 is frictionally retained on the right hand end of body 14 to close the semi-cylindrical recess except for a semi-annular slot 42 through which the indicator 30 may project. Compression springs 44 are received in suitable bores in the body 14 to urge the indicator 30 to the left in Fig. 1.

Slideable in a transverse bore in the body 14 is a latch pin 46 which is actuatable by the forked end of a lever 48. The latter projects from the housing 50 of a relay which is mounted on the body by a bracket 52 and a clamp 54. An ignition switch 56 is secured to the rear end of the body 14 and has a stem 58 connected by a tongue and groove connection to the lock cylinder 20. The lock cylinder 20 has an upstanding curved cam 60 which projects radially a uniform distance throughout its length and lies within the recess 34.

The relay 50 comprises a frame 62 having an armature 64 attached to the lever 48. A switch 66 of the normally closed type is connected to the lever 48 by a pin 68 so as to be opened when the armature 64 is attracted by the energization of relay coil 70. A suitable dash pot 72 may be connected to the pin 68 for the purpose of delaying the opening action of the relay.

Referring now to Fig. 6, the crankcase wall of a motor vehicle engine is indicated at 74 at a point where the usual dipstick opening 76 is provided. Mounted in the opening is a float switch comprising a stationary stem 78 carrying a collar 80 and a switch 82 at its upper end. Pivoted to the lower end of the stem 78 is a float arm 84 having a float 86 attached thereto. A switch actuating rod 88 is slideably mounted alongside the stem 78 and abuts the lever 84 so as to transmit its motion to the switch 82 to close the same when the float 86 drops to a predetermined low level.

As shown in Fig. 8, the elements are connected in a circuit with the usual battery 90, the switch 82 being in series with the coil 70 of the relay and also in series with the switch 66.

In operation, with the crankcase oil level at normal height such as indicated by the dotted line in Fig. 6, the switch 82 is opened and relay coil 70 is thereby de-energized. To start the engine, the key is placed in the cylinder 20 and the latter rotated to turn the ignition switch on. This causes the upstanding cam 60 to move to position where an end portion thereof lies against the right hand edge of the recess 34, so as to hold the stem 32 in its right hand position, shown. The indicator 30 is thus mechanically held in its retracted position whenever the ignition switch is turned on and it is immaterial whether or not the latch pin 46 should be momentarily released for any reason so long as the ignition switch is in "on" position. Thus, the cam 60 inhibits the action of the indicator 30 while the engine is on.

When it is desired to stop the engine, the cylinder 20 is restored to its "off" position, thus returning the cam 60 to the position illustrated in Fig. 1. If the level of the oil in the crankcase is adequately high, the switch 82 will be maintained open and the latch 46 will remain in its downward position as shown in Fig. 1, thus preventing projection of the indicator 30 while the engine is stopped.

Should, however, the oil level in the crankcase be low enough to make a warning desirable, the float switch 82 will then be closed through the action of lever 84 and rod 88. It will be noted that the circuit of Fig. 8 does not include the ignition switch so that closure of switch 82 causes the coil 70 of the relay 50 to be energized and this retracts the latch pin 46 after a predetermined interval. This interval is determined by delaying action of dash pot 72. The lifting of lever 48 also opens the switch 66. Although this has been shown as a simple pair of leaves, it is desirable to make the switch 66 of the snap acting type and the present illustration is intended as a diagrammatic indication thereof.

The lifting of latch pin 46 by lever 48 releases the stem 32 allowing the indicator 30 to be projected leftwardly in Fig. 1 by the springs 44. The end portion 36 of stem 32 rides under the latch pin 46 and holds it up so that the switch 66 is prevented from reclosing.

It will be seen from a comparison between Figs. 4 and 5 that the projecting indicator overlies the normal location of the key and although it does not interfere with the removal and reinsertion of the key, does occupy a prominent position where it is necessarily observed whenever the driver is using the key. If the key is again used to turn the ignition on, the action of the upstanding cam 60 against the right hand edge of the recess 34 serves to cam the indicator stem 32 back to its retracted position. Without turning the key, however, it may be pushed inwardly and become latched with a direct push of the thumb. The latching of the indicator in its retracted position will, of course, take place only if the oil level in the crankcase has been raised by the proper added amount of oil so that switch 82 is again opened. As soon, however, as the ignition is turned on, the indicator is inhibited by the action of the cam 60 independently of the latch pin 46 and float 86.

Referring now to Fig. 9, a portion of a typical vehicle electric system is there illustrated wherein the battery 110 supplies a live line 112 from which an ignition circuit comprising the switch 114, the coil 116 and the circuit interrupter 118 branch off to the common ground. The indicator of the present invention may comprise a casing 120 carrying a relay coil 122 and an annunciator tripping coil 124. The relay 122 controls a pair of normally open contacts 126 while the coil 124 releases a spring engaged latch 128. The latch controls an annunciator flag 130 which is biased toward the dotted line position by a spring 132. A projection 134 on the flag 130 closes a pair of normally open contacts 136 whenever the flag is held in its solid line position by the latch 128.

A condition responsive indicator, for example a float switch, is indicated at 140. This may comprise a fitting 142 adapted to take the place of a crankcase drain plug and having a central insulated electrode 144. A diaphragm 146 of a flexible impervious material carries a movable contact 148 on its lower face which, when the diaphragm is lowered, connects the electrode 144 to a grounded electrode 150. A float 152 is attached centrally to the diaphragm and slides in a perforated guide tube 154. The float may be one of a series of floats with different spacings from the diaphragms so as to accommodate the oil level desired for any particular crankcase.

The indicator mechanism and the condition responsive switch are connected to the vehicle electric circuit in the following manner. From the live line 112 a branch 156 connects with the contacts 136. The latter are in series with the annunciator coil 124 and the contacts 126 by means of conductors 158 and 160. From the contacts 126 a conductor 162 extends to the central electrode 144 of the float switch 140. From a point between the ignition switch 114 and the coil 116 a conductor 164 extends to the relay coil 122, the other side of which is connected to the common ground.

In operation of this form of the invention, with the switch 140 mounted in the drain hole of the crankcase, and with a float 152 having been selected to coordinate with the desired oil level in the crankcase and with the oil in the crankcase above that level, the float 152 will hold the switch 140 open. During times while the engine is stopped, contacts 126 will be closed because relay 122 is de-energized by reason of ignition switch 114 being open. With the annunciator flag 130 in the latched condition, contacts 136 are also closed but no current flows in coil 124 because of the open float switch 140. When the engine is started, relay 122 becomes energized, opening contacts 126 so that any temporary closure of float switch 140 by reason of agitation of oil in the crankcase is ineffective to energize tripping coil 124.

As the oil in the crankcase gradually becomes consumed, a point is reached where the oil level, when the engine has been stopped, falls below the desired level. Action under these conditions is as follows:

So long as the engine remains running after the oil consumption reaches the desired critical value, nothing takes place because relay 122 is holding contacts 126 open. At the first time that the ignition switch 114 is opened, however, relay 126 closes and the instant that float switch 140 closes as the oil settles down, the tripping coil 124 will be energized. This releases the latch 128 permitting the flag 130 to rise and show the driver a warning that the oil level is low. The raising of flag 130 opens contacts 136, thus breaking the circuit for coil 124 and preventing a continuous battery drain while the vehicle is standing idle. Thereafter the driver may fill the crankcase to the desired level and reset the flag 130.

It will be understood that the relay 126 may be of the time delay, slow opening, fast closing type if it is desired to delay "reading" the oil level until allowance has been made for complete settling of the oil after the engine has stopped.

It will thus be seen that the invention provides an improved electrically operated indicator which is rendered effective by the combination of a predetermined condition being reached in some part of the vehicle, together with the ignition having been shut off. This indication is furthermore achieved without requiring more than a momentary impulse of battery current and thus avoids continuous battery drain while the warning indication is showing.

While the forms of embodiment of the invention as herein disclosed constitutes preferred forms, it is to be understood that other forms might be adopted, all coming within the scope of the claims which follow.

What is claimed is as follows:

1. A motor vehicle condition alarm system for use with an electric ignition type of engine comprising a switch responsive to a condition to be monitored, a mechanically latched, electrically released type annunciator having a release coil in series with said switch, a second switch in series with the release coil and arranged to be opened upon energization of the engine ignition and a third switch in series with the release coil and arranged to be opened upon release of the annunciator.

2. An alarm system for a motor vehicle provided with an on-off switch for supplying current to operate the vehicle motor comprising a monitoring switch operated by changes in a condition to be monitored, a manually resettable warning signal having electric actuating means controlled by said switch, and a first means for preventing energization of the actuating means which prevents such energization when the on-off switch is on and a second means for preventing such energization whenever the signal has been actuated.

3. A low liquid level indicator for a motor vehicle provided with an on-off switch for supplying current to operate the vehicle motor comprising a switch controlled by changes in liquid level, a manually resettable warning signal having electric actuating means controlled by said switch, and a first means for preventing energization of the actuating means which prevents such energization when the on-off switch is on and a second means for preventing such energization whenever the signal has been actuated.

4. A liquid level alarm system for use with a motor vehicle comprising a normally open, liquid level responsive switch arranged to be closed when the level of the liquid being monitored reaches a pre-determined low value, a mechanically latched, electrically released type annunciator having a release coil in series with said switch, a second switch in series with the release coil and arranged to be opened whenever the vehicle motor is in operation and a third switch in series with the release coil arranged to be opened upon release of the annunciator.

5. An automatic warning system for use in a motor vehicle having an engine and a source of electric current comprising a visible indicator shiftable between a "safe" position and a "warn" position and normally biased towards the "warn" position, a detent for holding the indicator in the "safe" position, an electrically actuated device for releasing the detent, a signal circuit connected with the source for energizing said detent releasing device, means for energizing the signal circuit only when the engine is shut off, a monitor switch in the circuit for controlling the detent releasing device in response to changes in the condition to be monitored and means in the signal circuit responsive to the shifting of the indicator to the "warn" position for interrupting flow of current in the signal circuit, whereby a warning signal may be given when the engine is shut off and the warning signal may remain effective during long periods of non-use of the vehicle without drawing current in the signal circuit.

6. A liquid level alarm system for use with a motor vehicle comprising a normally open, liquid level responsive switch arranged to be closed when the level of the liquid being monitored reaches a pre-determined low value, a mechanically latched, electrically released type annunciator having a release coil in series with said switch, a second switch in series with the release coil and arranged to be opened whenever the annunciator is released, an on-off control device for the motor vehicle and means operated by the placing of said device in its on position for inhibiting the action of the annunciator regardless of the condition of either of said switches.

7. A liquid level alarm system for use with a motor vehicle comprising a normally open, liquid level responsive switch arranged to be closed when the level of the liquid being monitored reaches a pre-determined low value, a mechanically latched, electrically released type annunciator having a release coil in series with said switch, a second switch in series with the release coil and arranged to be opened whenever the annunciator is released, an ignition switch for the vehicle and means operated by the ignition switch when in its on position for inhibiting the action of the annunciator regardless of the condition of either of said switches.

8. A liquid level alarm system for use with a motor vehicle comprising a normally open, liquid level responsive switch arranged to be closed when the level of the liquid being monitored reaches a pre-determined low value, a mechanically latched, electrically released type annunciator having a release coil in series with said switch, a second switch in series with the release coil and arranged to be opened whenever the annunciator is released, an ignition switch for the vehicle and means including a mechanical cam, operated by the ignition switch when in its on position for inhibiting the action of the annunciator regardless of the condition of either of said switches.

9. A liquid level alarm system for use with a motor vehicle comprising a normally open, liquid level responsive switch arranged to be closed when the level of the liquid being monitored reaches a pre-determined low value, a mechanically latched, electrically released type annunciator having a release coil in series with said switch, a second switch in series with the release coil and arranged to be opened whenever the annunciator is released, an ignition switch for the vehicle and means including a mechanical cam, operated by the ignition switch when in its on position for inhibiting the action of the annunciator regardless of the condition of either of said switches, said annunciator comprising a member positioned adjacent the ignition switch and shiftable from a concealed to an exposed position whenever released by said switches and cam.

10. An automatic warning system for use in a motor vehicle having an engine and a source of electric current comprising a visible indicator shiftable between a "safe" position and a "warn" position and normally biased towards the "warn" position, a detent for holding the indicator in the "safe" position, an electrically actuated device for releasing the detent, a signal circuit connected with the source for energizing said detent releasing device, means for inhibiting the release of the signal while the engine is on, a monitor switch in the circuit for controlling the detent releasing device in response to changes in the condition to be monitored and means in the signal circuit responsive to the shifting of the indicator to the "warn" position for interrupting flow of current in the signal circuit, whereby a warning signal may be given when the engine is shut off and the warning signal may remain effective during low periods of non-use of the vehicle without drawing current in the signal circuit.

11. An automatic warning system for use in a motor vehicle having an engine, an ignition switch, and a source of electric current comprising a visible indicator shiftable between a "safe" position and a "warn" position and normally biased towards the "warn" position, a detent for holding the indicator in the "safe" position, an electrically actuated device for releasing the detent, a signal circuit connected with the source for energizing said detent releasing device means controlled by the ignition switch for inhibiting the release of the signal while the engine is on, a monitor switch in the circuit for controlling the detent releasing device in response to changes in the condition to be monitored and means in the signal circuit responsive to the shifting of the indicator to the "warn" position for interrupting flow of current in the signal circuit, whereby a warning signal may be given when the engine is shut off and the warning signal may remain effective during long periods of non-use of the vehicle without drawing current in the signal circuit.

12. An automatic warning system for use in a motor vehicle having an engine, an on-off control device therefor, and a source of electric current comprising a visible indicator shiftable between a "safe" position and a "warn" position and normally biased towards the "warn" position, a detent for holding the indicator in the "safe" position, an electrically actuated device for releasing the detent, a signal circuit connected with the source for energizing said detent releasing device, means including a cam associated with said control device for inhibiting the release of the signal while the engine is on, a monitor switch in the circuit for controlling the detent releasing device in response to changes in the condition to be monitored and means in the signal circuit responsive to the shifting of the indicator to the "warn" position for interrupting flow of current in the signal circuit, whereby a warning signal may be given when the engine is shut off and the warning signal may remain effective during long periods of non-use of the vehicle without drawing current in the signal circuit.

No references cited.